United States Patent
Erné

(10) Patent No.: US 11,013,240 B2
(45) Date of Patent: May 25, 2021

(54) SENSOR SYSTEM FOR PATTY FORMING MACHINE AND METHOD OF USE

(71) Applicant: Provisur Technologies, Inc., Chicago, IL (US)

(72) Inventor: Wouter Bart Erné, New Lenox, IL (US)

(73) Assignee: PROVISUR TECHNOLOGIES, INC., Chicago, IL (US)

( * ) Notice: Subject to any disclaimer, the term of this patent is extended or adjusted under 35 U.S.C. 154(b) by 51 days.

(21) Appl. No.: 16/351,826

(22) Filed: Mar. 13, 2019

(65) Prior Publication Data

US 2019/0281842 A1  Sep. 19, 2019

Related U.S. Application Data

(60) Provisional application No. 62/643,903, filed on Mar. 16, 2018.

(51) Int. Cl.
*A22C 7/00* (2006.01)
*A23P 30/10* (2016.01)

(52) U.S. Cl.
CPC .......... *A22C 7/0076* (2013.01); *A22C 7/0069* (2013.01); *A23P 30/10* (2016.08); *A22C 7/00* (2013.01); *A22C 7/003* (2013.01); *A22C 7/0084* (2013.01)

(58) Field of Classification Search
CPC ......... A22C 7/00; A22C 7/003; A22C 7/0069; A22C 7/0076; A22C 7/0084; A23P 30/10
USPC ....................................................... 425/430
See application file for complete search history.

(56) References Cited

U.S. PATENT DOCUMENTS

| 1,545,266 | A | 7/1925 | Marsa |
| 3,427,649 | A | 2/1969 | Fay |
| 3,768,228 | A | 10/1973 | Doering, Jr. |
| 3,813,846 | A | 6/1974 | Doering, Jr. |
| 3,851,355 | A | 12/1974 | Hughes |

(Continued)

FOREIGN PATENT DOCUMENTS

| EP | 2449893 A1 | 9/2012 |
| FR | 2538223 A1 | 6/1984 |

(Continued)

OTHER PUBLICATIONS

International Preliminary Report on Patentability from International Patent Application No. PCT/US2019/021982 dated Sep. 22, 2020 9 pages.

(Continued)

*Primary Examiner* — Joseph S Del Sole
*Assistant Examiner* — Lawrence D. Hohenbrink, Jr.
(74) *Attorney, Agent, or Firm* — Klintworth & Rozenblat IP LLP

(57) ABSTRACT

A patty forming machine is configured to mold food products. The machine includes a stripper plate through which food product is configured to pass when the stripper plate is in a fill position, a sensor configured to determine positions of the stripper plate, a movable mold, and a sensor configured to determine positions of the mold. A processor is operatively coupled with the sensors. The processor is configured to receive information from the sensors and to determine when the stripper plate is to be moved from the non-fill position to the fill position relative to a determined position of the mold.

12 Claims, 15 Drawing Sheets

(56) References Cited

U.S. PATENT DOCUMENTS

| | | | |
|---|---|---|---|
| 3,887,964 A | 6/1975 | Richards | |
| 4,054,967 A | 10/1977 | Sandberg et al. | |
| 4,118,831 A | 10/1978 | Holly et al. | |
| 4,182,003 A | 1/1980 | Lamartino et al. | |
| 4,193,167 A | 3/1980 | Orlowski et al. | |
| 4,212,609 A | 7/1980 | Fay | |
| 4,276,318 A | 6/1981 | Orlowski et al. | |
| 4,284,973 A | 8/1981 | Howell et al. | |
| 4,298,326 A | 11/1981 | Orlowski | |
| 4,356,595 A | 11/1982 | Sandberg et al. | |
| 4,404,229 A | 9/1983 | Treharne | |
| 4,646,385 A | 3/1987 | Roberts et al. | |
| 4,653,997 A | 3/1987 | Sheffield et al. | |
| 4,768,260 A | 9/1988 | Sandberg | |
| 4,957,425 A | 9/1990 | Fay | |
| 4,975,039 A | 12/1990 | Dare et al. | |
| 5,297,947 A | 3/1994 | Cardinali | |
| 5,340,599 A | 8/1994 | Marayama et al. | |
| 5,411,390 A | 5/1995 | Fay | |
| 6,261,620 B1 | 7/2001 | Leadbeater | |
| 6,517,340 B2 | 2/2003 | Sandberg | |
| 6,572,360 B1 | 6/2003 | Buhlke et al. | |
| 6,811,802 B2 | 11/2004 | van Esbroeck et al. | |
| 7,284,973 B2 | 10/2007 | van Esbroeck et al. | |
| 7,597,549 B2 | 10/2009 | van Esbroeck et al. | |
| 7,819,650 B2 | 10/2010 | Meskendahl et al. | |
| 7,862,330 B2 | 1/2011 | Hansen et al. | |
| 7,976,303 B2 | 7/2011 | van der Eerden et al. | |
| 8,029,841 B2 | 10/2011 | Van Esbroeck et al. | |
| 8,469,697 B2 | 6/2013 | Lindee et al. | |
| 8,753,107 B2 | 6/2014 | Lindee et al. | |
| 9,028,239 B2 | 5/2015 | Van Gerwen | |
| 9,095,171 B2 | 8/2015 | Lindee et al. | |
| 9,113,638 B2 | 8/2015 | Lindee et al. | |
| 9,114,553 B2 | 8/2015 | Lindee et al. | |
| 9,119,403 B2 | 9/2015 | Van Gerwen | |
| 9,457,495 B2 | 10/2016 | Lindee et al. | |
| 9,485,997 B2 | 11/2016 | Van Gerwen | |
| 9,526,269 B2 | 12/2016 | van Doorn et al. | |
| 9,635,866 B2 | 5/2017 | Meulendijks et al. | |
| 10,011,053 B2 | 7/2018 | Lindee et al. | |
| 2005/0072312 A1 | 4/2005 | Pasek et al. | |
| 2005/0220932 A1 | 10/2005 | van der Eerden et al. | |
| 2007/0098862 A1 | 5/2007 | Hansen et al. | |
| 2007/0224305 A1 | 9/2007 | Meskendahl et al. | |
| 2007/0224306 A1 | 9/2007 | van Esbroeck et al. | |
| 2007/0295228 A1 | 12/2007 | Gosz et al. | |
| 2008/0233228 A1 | 9/2008 | Lindee et al. | |
| 2009/0134308 A1 | 5/2009 | van der Eerden et al. | |
| 2009/0134544 A1 | 5/2009 | Van Der Eerden et al. | |
| 2011/0042855 A1 | 2/2011 | Puest et al. | |
| 2012/0058213 A1* | 3/2012 | Lindee | A22C 7/0084 425/135 |
| 2013/0224357 A1 | 8/2013 | Van Gerwen | |
| 2014/0199423 A1 | 7/2014 | Righolt et al. | |
| 2015/0320059 A1 | 11/2015 | Lindee et al. | |
| 2016/0255846 A1 | 9/2016 | Lindee et al. | |
| 2017/0224006 A1 | 8/2017 | Seemann et al. | |

FOREIGN PATENT DOCUMENTS

| | | |
|---|---|---|
| WO | 2015/012690 A2 | 1/2015 |
| WO | 2018/111108 A2 | 6/2018 |

OTHER PUBLICATIONS

"Fill Plate—.38 Tenderform," Drawing No. D-73894, dated Oct. 22, 2015, 1 page.
"Hard Chrome," Drawing No. D-22884, dated Feb. 13, 1990, 1 page.
"Plate-Fill-T/F—30° Angle," Drawing No. ED-9675, dated Jan. 27, 1995, 1 page.
"Plate-Fill-Tenderform 400 Series SST," D-36546, dated Dec. 9, 1998, 1 page.
"Plate-Fill-Tenderform RoyAlloy EDRO#6," D-73335, dated Nov. 18, 2014, 1 page.
"Plate-T/F-.25 Dia Angled 45° Roy Alloy EDRO#6," D-67228, dated Jun. 6, 2011, 1 page.
Translation of FR2538223A1.
International Search Report from corresponding International Patent Application Serial No. PCT/US2019/021982 dated May 7, 2019, 2 pages.
Written Opinion from corresponding International Patent Application Serial No. PCT/US2019/021982 dated May 7, 2019, 2 pages.

* cited by examiner

SENSOR SYSTEM FOR PATTY FORMING MACHINE AND METHOD OF USE

CROSS-REFERENCE TO RELATED APPLICATION(S)

This application claims the priority of U.S. provisional application Ser. No. 62/643,903, filed on Mar. 16, 2018, the contents of which are incorporated herein in its entirety.

FIELD OF THE DISCLOSURE

The present disclosure relates to a control system for a patty molding machine configured for use forming patties.

BACKGROUND

Food patties of various kinds, including hamburgers, molded steaks, fish cakes, chicken patties, pork patties, potato patties, and others, are frequently formed in high-volume automated molding machines. U.S. Pat. No. 8,469,697 discloses an example of a rotary molding system for molding food products.

SUMMARY

A patty forming machine is configured to mold food products. The machine includes a stripper plate through which food product is configured to pass when the stripper plate is in a fill position, a sensor configured to determine positions of the stripper plate, a movable mold, and a sensor configured to determine positions of the mold. A processor is operatively coupled with the sensors. The processor is configured to receive information from the sensors and to determine when the stripper plate is to be moved from the non-fill position to the fill position relative to a determined position of the mold.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

DETAILED DESCRIPTION

Figure 1:
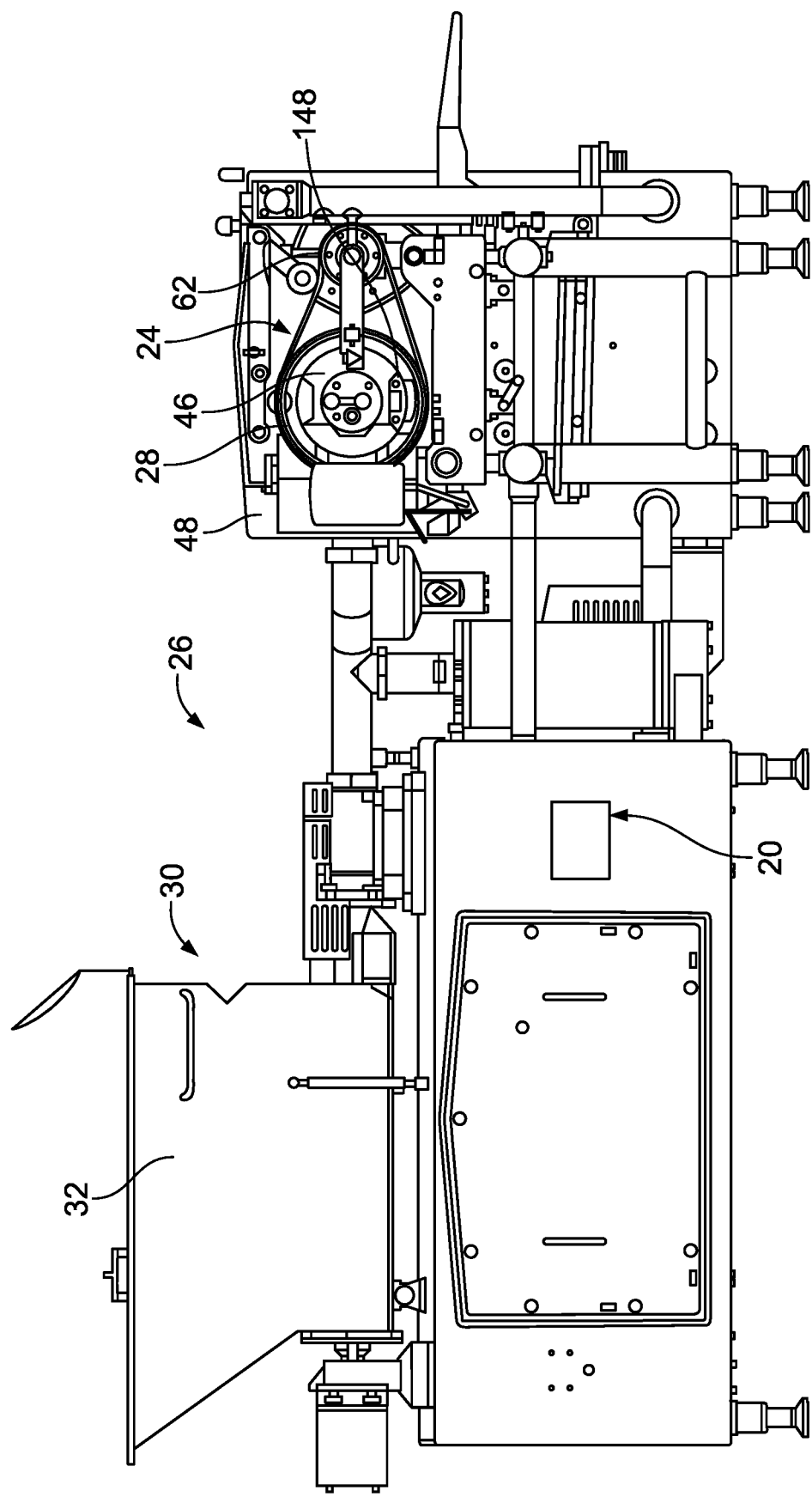
FIG. 1 depicts a side elevation view of an embodiment of a patty forming machine in which a rotary molding system is used.

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

A control system 20 is provided and is used to control the position of a stripper plate 22 of a molding system 24 in a patty forming machine 26 by using information from the positioning of a mold 28 of the molding system 24. In an embodiment, the molding system 24 is a rotary molding system wherein the mold 28 rotates around an axis, and FIG. 1 illustrates the primary components of an embodiment of a rotary molding system. While the drawings show the control system 20 used in association with a rotary molding system, the control system 20 can be used in association with a reciprocating or slide plate molding system wherein the mold reciprocates backward and forward as is known in the art.

In general, the patty forming machine 26 includes a feeder portion 30 which supplies food product to the molding system 24. In an embodiment, the feeder portion 30 is formed from a hopper 32 connected to a pump box 34 by an auger system connected to a pump intake passage, a motor driven rotary pump, and a pump output passage (not shown). Such a feeder portion is disclosed in U.S. Pat. No. 8,469,697, the contents of which are incorporated herein in its entirety by reference, and is not described in detail herein.

Figure 3:
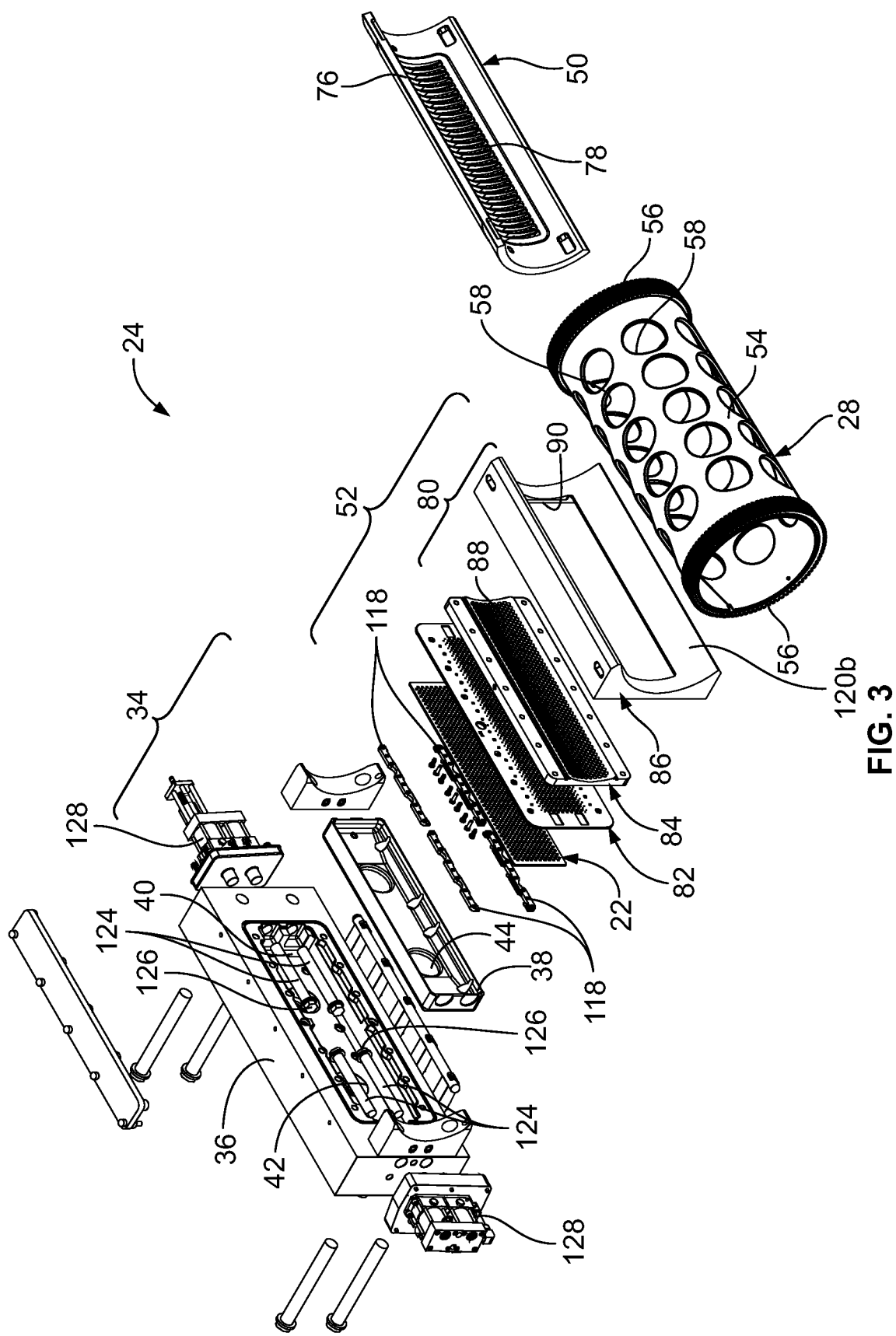
FIG. 3 depicts an exploded perspective view of the rotary molding system.
Figure 4:
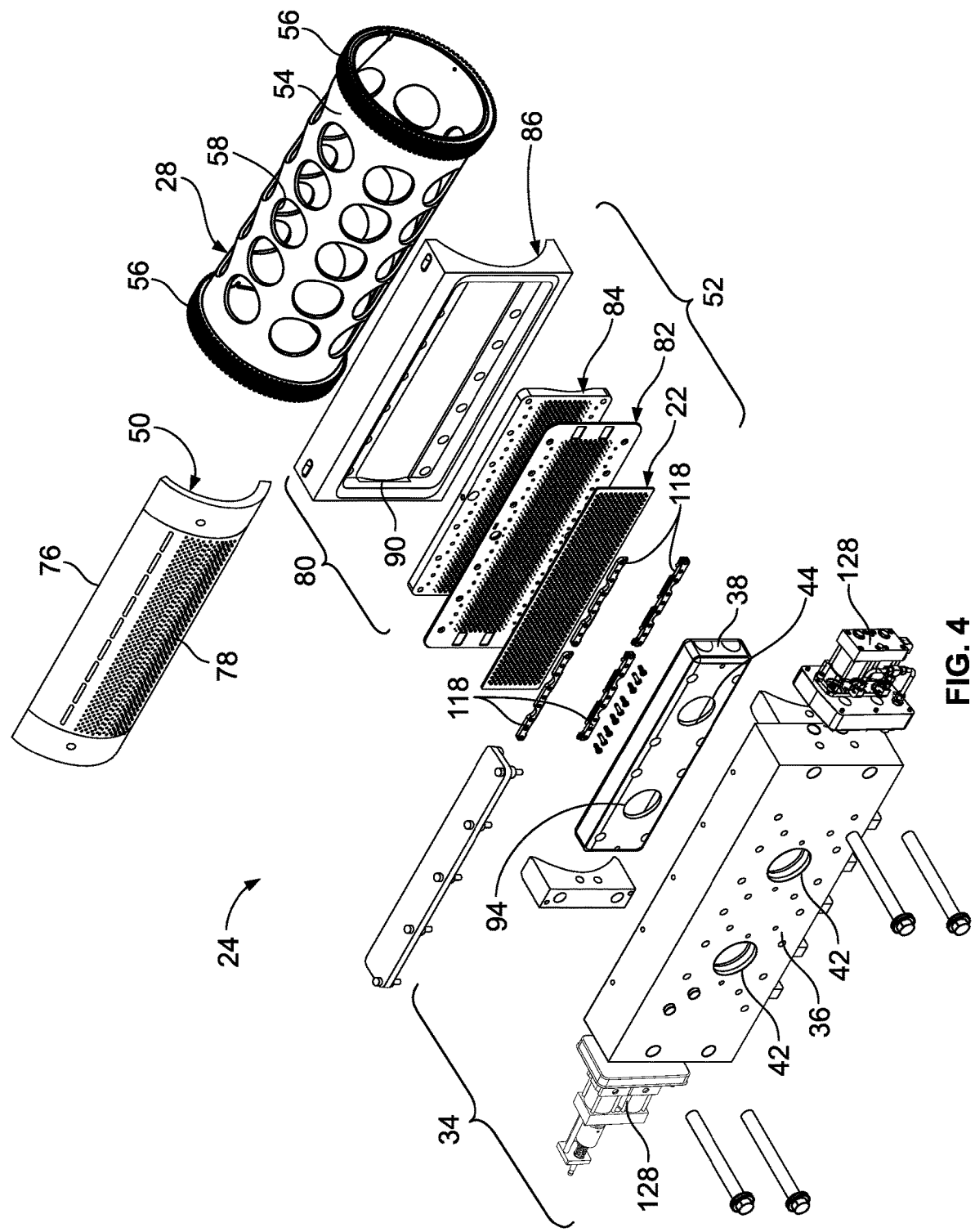
FIG. 4 depicts an alternate exploded perspective view of the rotary molding system.
Figure 5:
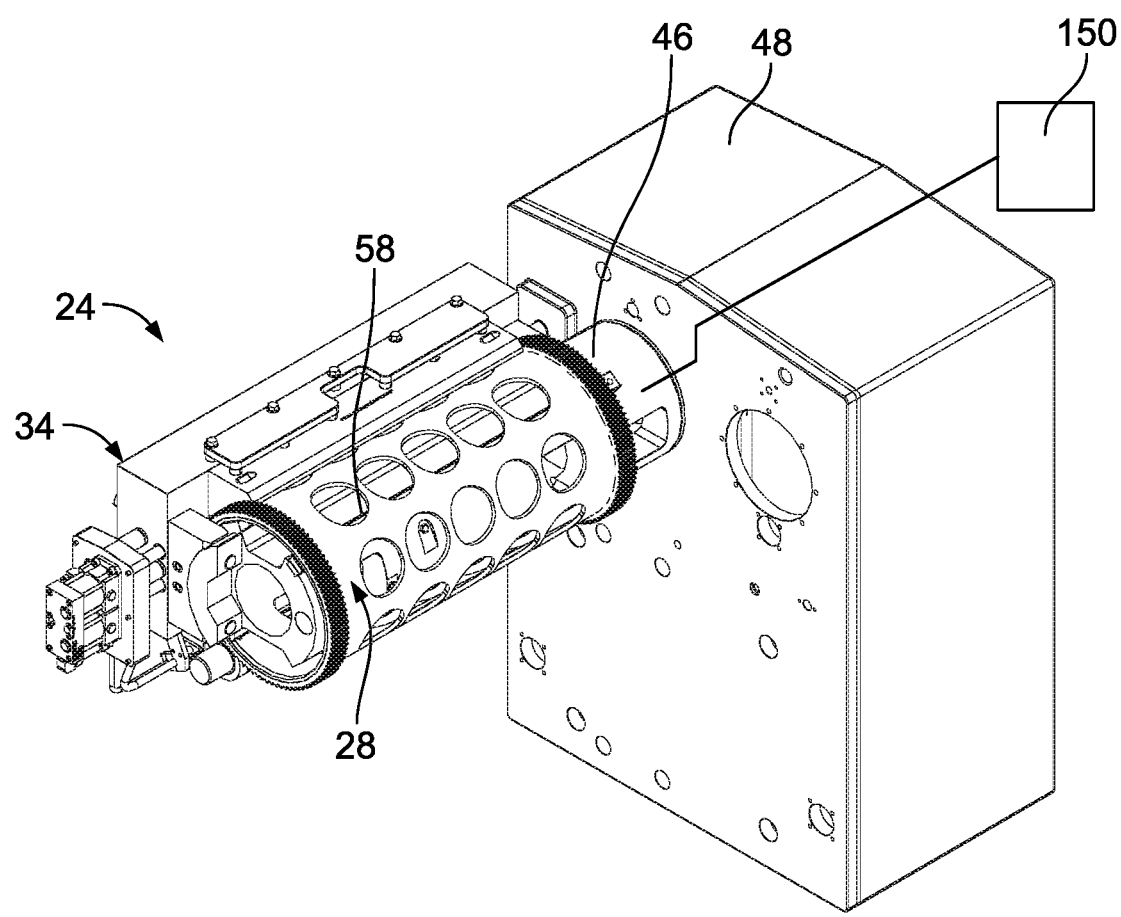
FIG. 5 depicts a perspective view of the rotary molding system.

As shown in FIGS. 3 and 4, the pump box 34 may include a housing 36 and an insert 38 inserted within a chamber 40 in the housing 36. When the housing 36 and insert 38 are connected together, a cavity is formed therebetween. The position of the insert 38 may be adjusted relative to the housing 36 in order to vary the size of the cavity therebetween. The housing 36 has at least one feed opening 42 and the insert 38 has at least one feed opening 44 to channel food product from the hopper 32 through the pump box 34. The feed openings 42, 44 may be aligned. In an embodiment, the pump box 34 is formed of a single component.

The molding system 24 includes a stationary support structure 46 which is attached to a cabinet 48 of the patty forming machine 26, the mold 28 mounted on the support structure 46 by an inner platen 50 (see FIG. 3), and a food channel assembly 52 which directs food product from the pump box 34 to the mold 28. In a rotary molding system, the mold 28 is rotatably mounted on the support structure 46. In a reciprocating molding system, the mold 28 is reciprocally mounted on the support structure 46.

In an embodiment, the support structure 46 is cantilevered from the cabinet 48. The support structure 46 may be formed of steel. Alternatively, the support structure 46 can be supported on both ends. In an embodiment, the support structure 46 is a mandrel.

The mold 28 is formed of a cylindrical wall 54, and a toothed gear ring 56 extending about the circumference of the wall 54 at each end thereof. A plurality of spaced apart mold cavities 58 are provided through the wall 54 and are disposed around the circumference of the wall 54. In an embodiment, the mold cavities 58 are provided in an array of rows and columns such that each mold cavity 58 in a given row commences at the same position of the mold 28 and such that each mold cavity 58 in a given row terminates at the same position of the mold 28. The wall 54 has a thickness which corresponds to the depth of the mold cavities 58. The number of mold cavities 58 around the circumference of the wall 54 can vary. In addition, the shape of the mold cavities 58 can vary. A motor 60 and associated structure 62 for moving the mold 28 relative to the support structure 46 is provided. Structures 62 for rotating the mold 28 are disclosed in U.S. Pat. No. 8,469,697, the contents of which have been incorporated herein.

In some embodiments, the motor 60 is a servomotor or stepper motor. In some embodiments, the motor 60 is a gear motor, a brushless DC servo motor, a Permanent Magnet DC (PMDC) motor an AC induction motor with modulated control signal and switches to control speed and direction of rotation, some combination thereof, or the like.

Figure 6:
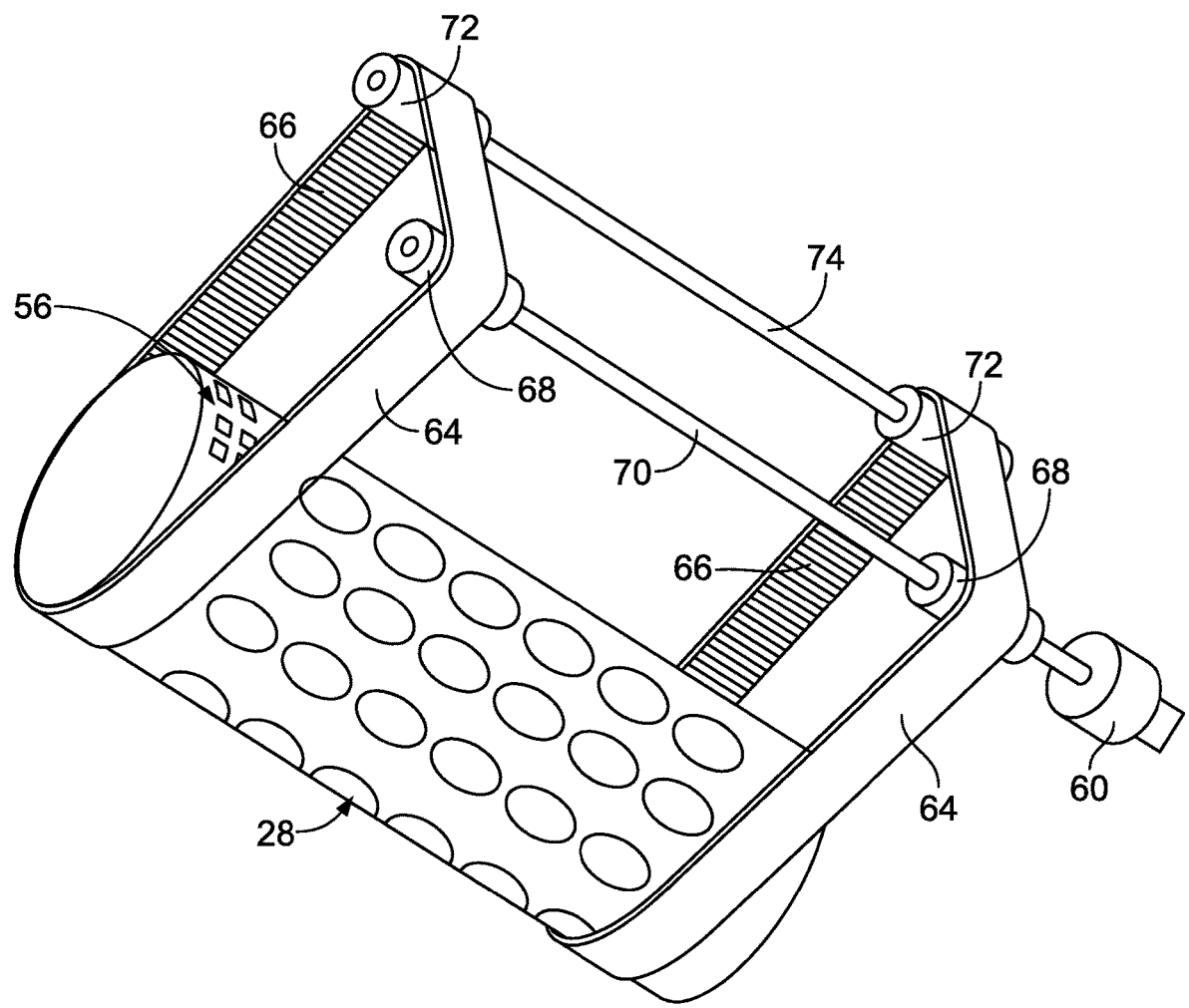
FIG. 6 depicts a perspective view of a portion of the rotary molding system.

As an example, the structure 62 for rotating the mold 28 is provided by toothed endless belts 64 connected to the motor 60 as illustrated in FIG. 6. The toothed gear ring 56 engages with a toothed surface 66 of the toothed endless belt 64. Each toothed endless belt 64 is driven by rollers 68 which are connected via a common shaft 70. The motor 60 drives the rollers 68. The toothed endless belts 64 are further supported by idler support rollers 72 connected via a common shaft 74. The rollers 68, 72 can optionally comprise a toothed ring. In an alternative embodiment, the idler support rollers 72 and their common shaft 74 can be removed depending on the desired configuration, such that the toothed endless belts 64 only wrap around one set of rollers 68.

As shown in FIGS. 3 and 4, the inner platen 50 is formed from a body 76 having a mold facing surface and an opposite support structure engaging surface. The mold facing surface is curved in accordance with the radius of curvature of the cylindrical mold 28. The support structure engaging surface may be curved. The inner platen 50 may be formed of plastic. The body 76 has perforations 78 therethrough which provides an air management system for allowing air to escape the mold cavities 58 as food product fills the mold cavities 58 and displaces the air in the mold cavities 58. The perforations 78 may take the form of an array of a plurality of distinct holes which form rows and columns. The inner platen 50 is affixed to the support structure 46 by suitable means such as fasteners, and is attached to the mold 28 such that the mold 28 can rotate around the inner platen 50 and the support structure 46.

The food channel assembly 52, see FIGS. 3 and 4, includes a fill plate 80 which is proximate to the mold 28, a wear plate 82 fixedly attached to the fill plate 80, and the stripper plate 22 movably attached to the wear plate 82. The stripper plate 22 moves in a reciprocating manner relative to the wear plate 82. The food channel assembly 52 is attached to the housing 36 of the pump box 34. In an embodiment, the fill plate 80 is formed of two parts, with an inner perforated body 84 which seats within an outer platen 86. The body 84 is formed of metal. The outer platen 86, if provided, is formed of plastic.

The inner perforated body 84 has holes 88 therethrough. An inlet surface of the body 84 is planar. An outlet surface of the body 84 may be planar or may be curved in accordance with the radius of curvature of the mold 28. The holes 88 may take the form of an array of a plurality of distinct holes which form rows and columns. The outlet surface of the body 84 is in in close proximity to, but spaced from, the outer surface of the mold 28. A sealing mechanism or layer (not shown) may be disposed on outlet surface of the body 84 to ensure adequate close contact with the mold 28 and to prevent food product from leaking from the mold cavities 58 once the mold cavities 58 are filled.

When the body 84, the mold 28 and the inner platen 50 are assembled together, the perforations 78 in the inner platen 50 are offset from the holes 88 in the body 84. The body 84 has substantially more holes 88 than the number of perforations 78 in the inner platen 50.

In an embodiment, the body 84 is mounted in the outer platen 86 which forms a frame for the body 84. A passageway 90 is provided through the outer platen 86 and extends from an inlet surface of the outer platen 86 to an outlet surface of the outer platen 86. The body 84 seats within the passageway 90. In an embodiment, the outer platen 86 is sandwiched between the pump box 34 and the mold 28, and is free floating relative to the pump box 34 and mold 28. In an embodiment, the outer platen 86 is affixed to the housing 36 of the pump box 34 by suitable means such as bolts, and is spaced from the mold 28.

Figure 7:
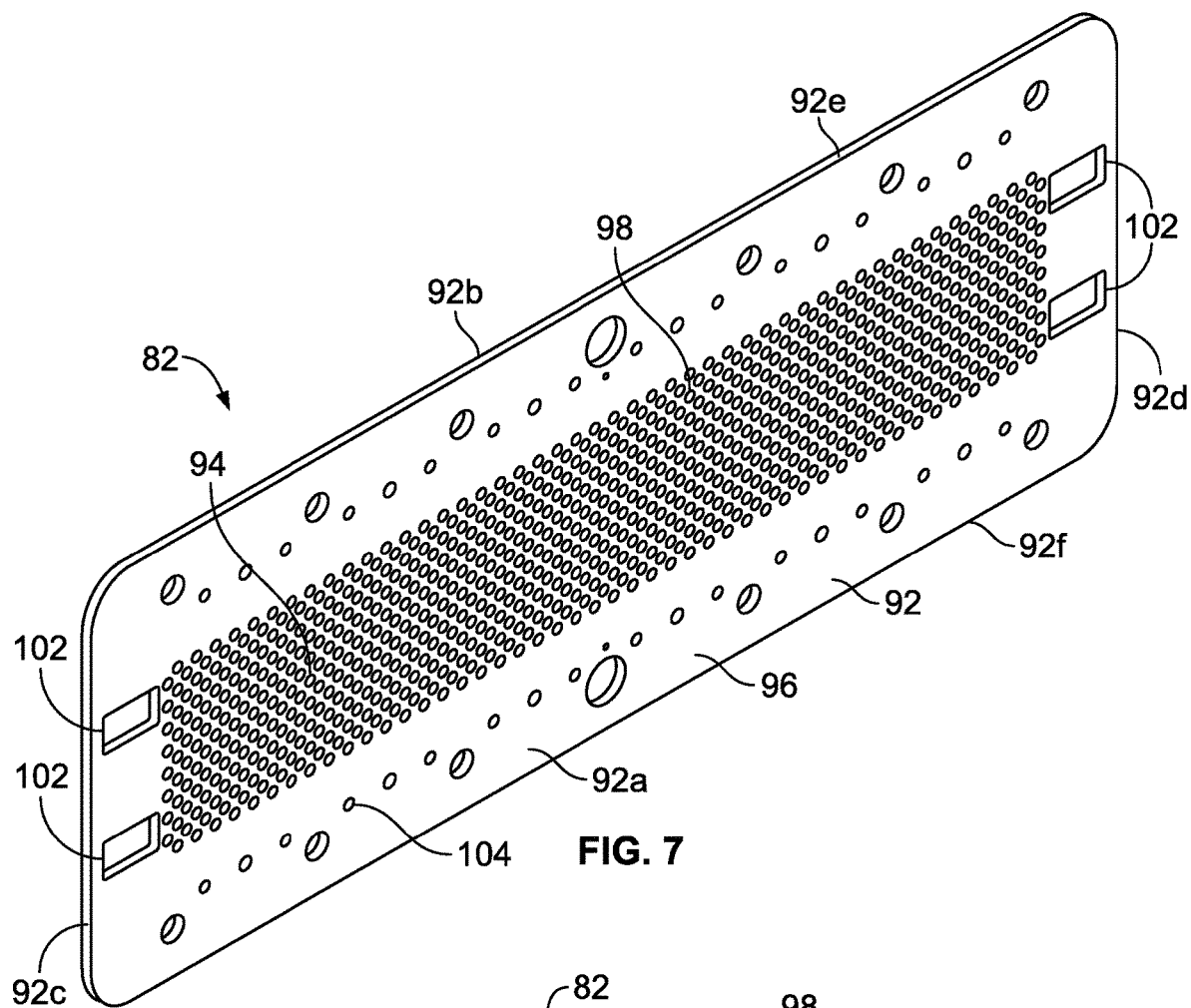
FIG. 7 depicts a perspective view of a wear plate of the rotary molding system.
Figure 8:
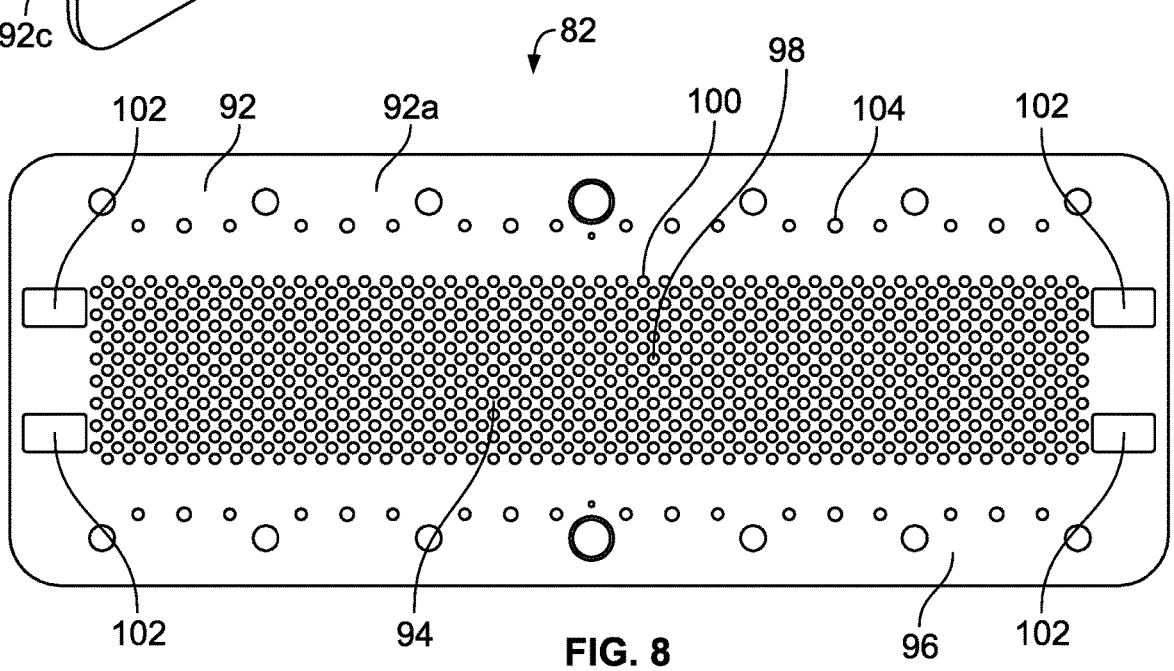
FIG. 8 depicts a plan view of the wear plate.

As shown in FIGS. 7 and 8, the wear plate 82 is formed from a body 92 having a first surface 92a and a second surface 92b defined by parallel side edges 92c, 92d and parallel end edges 92e, 92f. The wear plate 82 is formed of metal. The first and second surfaces 92a, 92b are planar. A length of the wear plate 82 is defined between the side edges 92c, 92d. The body 92 has a central perforated portion 94 with a non-perforated portion 96 extending around the perimeter of the central perforated portion 94 and between the central perforated portion 94 and the edges 92c, 92d, 92e, 92f. An array of a plurality of distinct holes 98 are provided through the central perforated portion 94 of the body 92. The walls 100 forming the holes 98 are straight from the first surface 92a to the second surface 92b, that is each hole 98 has a uniform diameter along its length from the first surface 92a to the second surface 92b. The central axis of each hole 98 is parallel to each other. In an embodiment, the holes 98 in the wear plate 82 have the same diameter as the holes 88 in the body 84. The wear plate 82 has two pairs of recesses 102 in each surface 92a, 92b in the non-perforated portion 96 proximate to, but spaced from, the side edges 92c, 92d. When the wear plate 82 is assembled with the body 84, the holes 98 in the wear plate 82 are aligned with the holes 88 in the body 84. The wear plate 82 has a plurality of apertures 104 through the non-perforated portion 96 proximate to, but spaced from, the end edges 92e, 92f.

The wear plate 82 can be assembled with the body 84 with either the first surface 92a abutting against the body 84 or with the second surface 92b abutting against the body 84 as the wear plate 82 is identically formed on both surfaces 92a, 92b.

Figure 9:
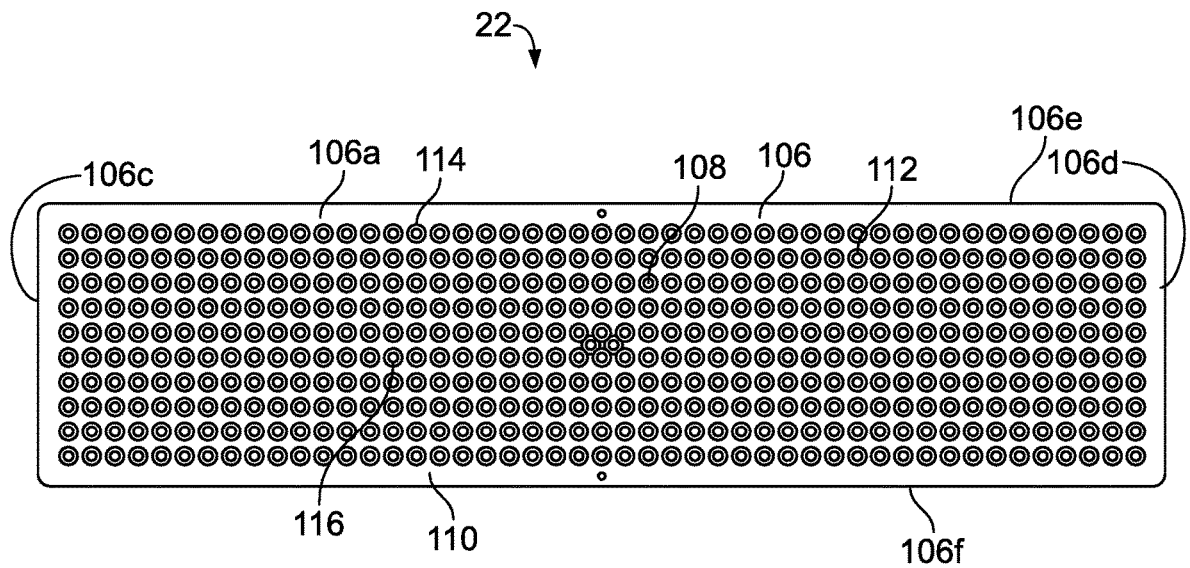
FIG. 9 depicts a plan view of a stripper plate of the rotary molding system.
Figure 10:
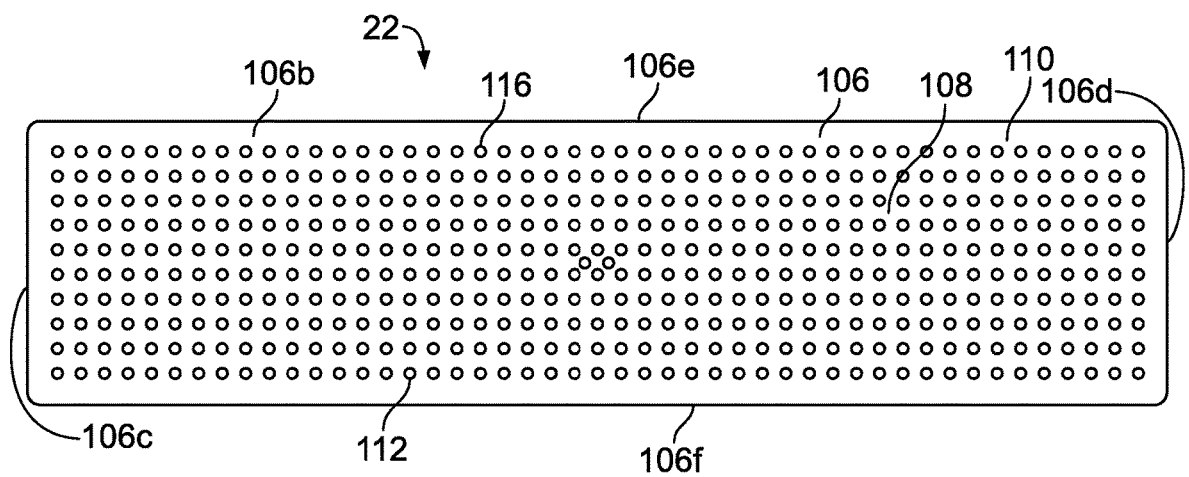
FIG. 10 depicts an alternate plan view of the stripper plate.

The stripper plate 22 is disposed between the wear plate 82 and the pump box 34 and is capable of reciprocal movement relative to the wear plate 82 and the pump box 34. The stripper plate 22 is formed of metal. As shown in FIGS. 9 and 10, the stripper plate 22 is formed from a body 106 having an inlet surface 106a and an outlet surface 106b defined by parallel side edges 106c, 106d and parallel end edges 106e, 106f. The inlet and outlet surfaces 106a, 106b are planar. A length of the stripper plate 22 is defined between the side edges 106c, 106d. The body 106 has a central perforated portion 108 with a non-perforated portion 110 extending around the perimeter of the central perforated portion 108 and between the central perforated portion 108 and the edges 106c, 106d, 106e, 106f. An array of a plurality of distinct holes 112 are provided through the central perforated portion 108 of the body. Each hole 112 in the array may be straight as it extends from the inlet surface 106a to the outlet surface 106b such that it has a uniform diameter along its length. Each of the holes 112 in the array or predetermined ones of the holes 112 in the array may have a tapered or frustoconical wall 114 extending from the inlet surface 106a and a straight wall 116 extending from the outlet end of the tapered or frustoconical wall 114 to the outlet surface 106b. The tapered or frustoconical wall 114 has its greatest diameter at its inlet end which is at the inlet surface 106a of the stripper plate 22 and has its smallest diameter at its outlet end which is at the junction of the tapered or frustoconical wall 114 and the straight wall 116. The tapered or frustoconical wall 114 has a continuously reducing diameter as it extends along its length from its inlet end to the outlet end. The straight wall 116 has a uniform diameter along its length. The holes 112 may be a combination of both types. In an embodiment, the holes 112 in the stripper plate 22 are aligned in rows and columns. In an embodiment, the holes 112 in the stripper plate 22 have the same diameter as the holes 88 in the body 84.

The holes 112 in the stripper plate 22 are aligned in rows and columns and when assembled with the wear plate 82 and in the fill plate 80, the holes 112 in the stripper plate 22 are aligned with the holes 98 in the wear plate 82 and the holes 88 in the body 84 when in a fill position, and when the stripper plate 22 is shifted, the holes 112 in the stripper plate 22 are offset from the holes 98 in the wear plate 82 and in the holes 88 in the body 84 when in a non-fill position.

Figure 11:
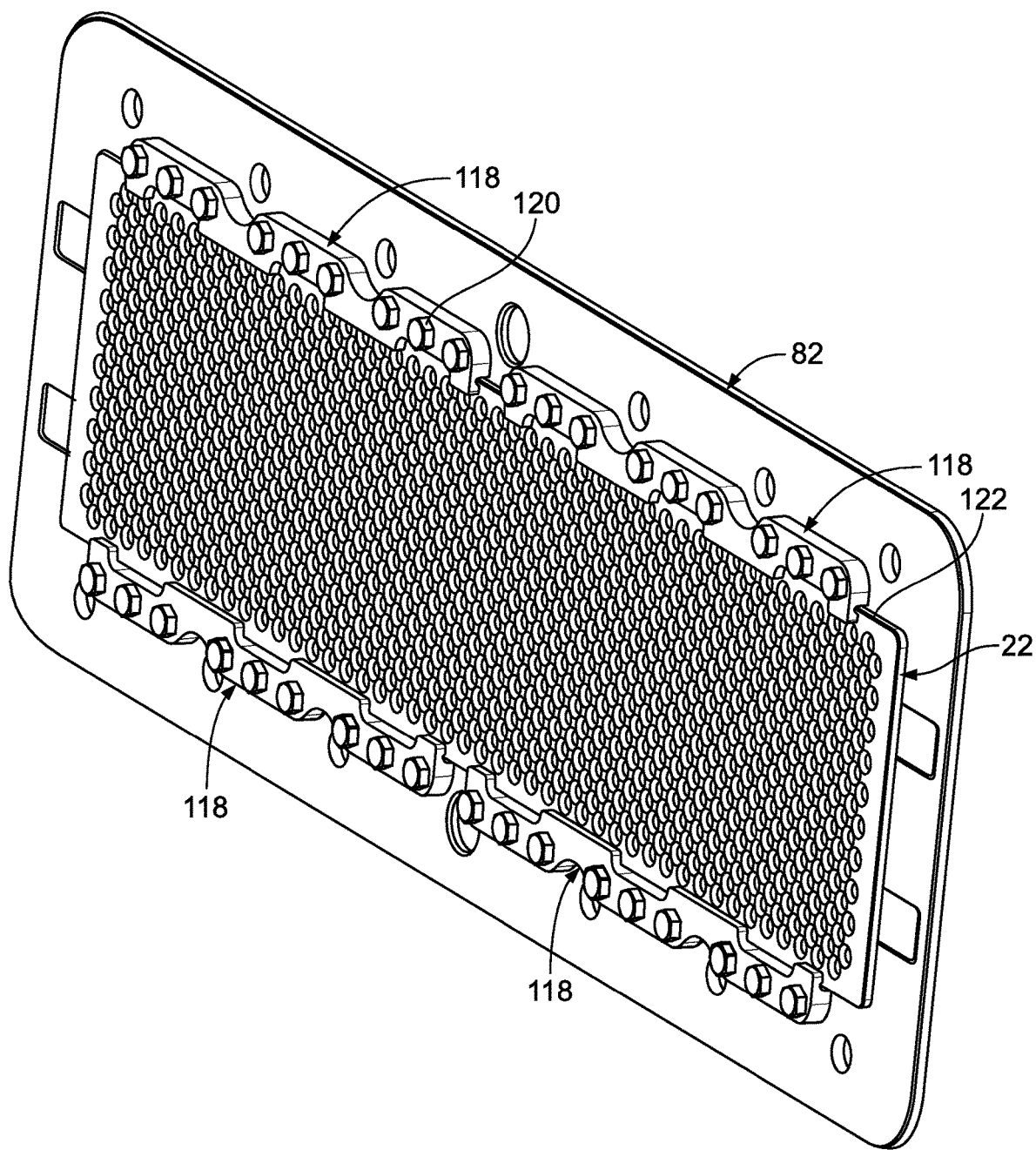
FIG. 11 depicts a perspective view of the stripper plate mounted on the wear plate by retainer bars.

As shown in FIG. 11, the stripper plate 22 is connected to the wear plate 82 by retainer bars 118 attached to the wear plate 82, for example by fasteners 120. Each retainer bar 118 has a recess 122 machined therein into which the stripper plate 22 seats.

The stripper plate 22 and the wear plate 82 seat within the pump box 34. The stripper plate 22 is proximate to the feed openings 42, 44 in the pump box 34. The planar inlet surface of the body 84 which forms the fill plate 80 seats against the first or second surface 92a, 92b of the wear plate 82 (depending upon which way the wear plate 82 is used). Thereafter, fasteners, such as bolts, are passed through the pump box 34, through the wear plate 82 and through the fill plate 80 to connect the pump box 34, the stripper plate 22, the wear plate 82 and the fill plate 80 together.

Figure 2:
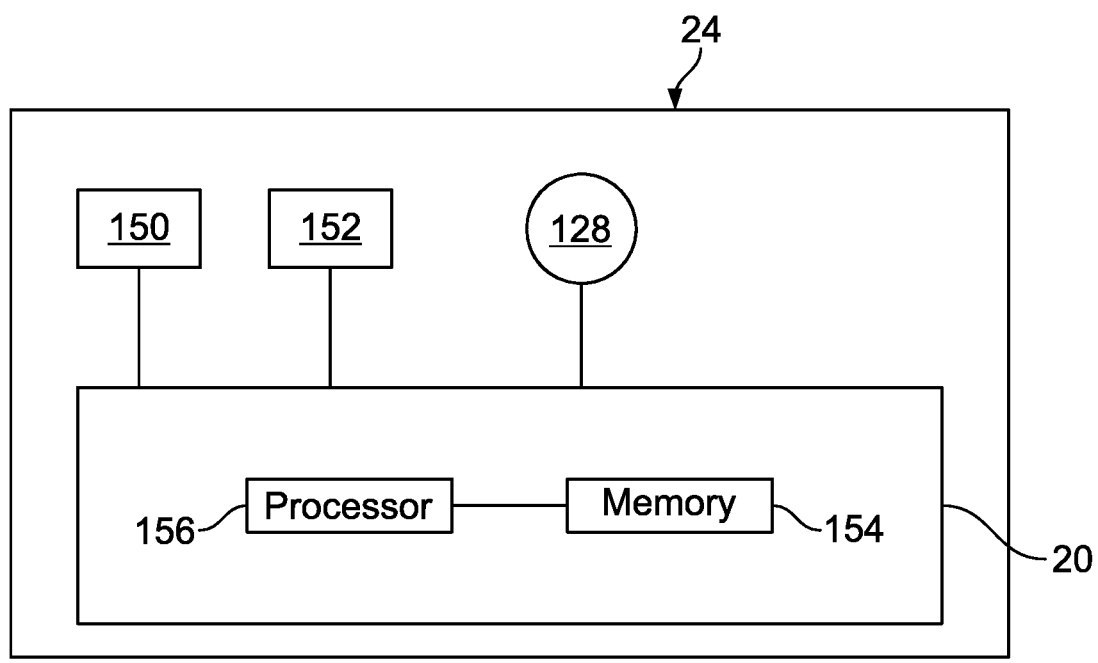
FIG. 2 depicts a block diagram of a control system for a patty forming machine such as that shown in FIG. 1.
Figure 12:
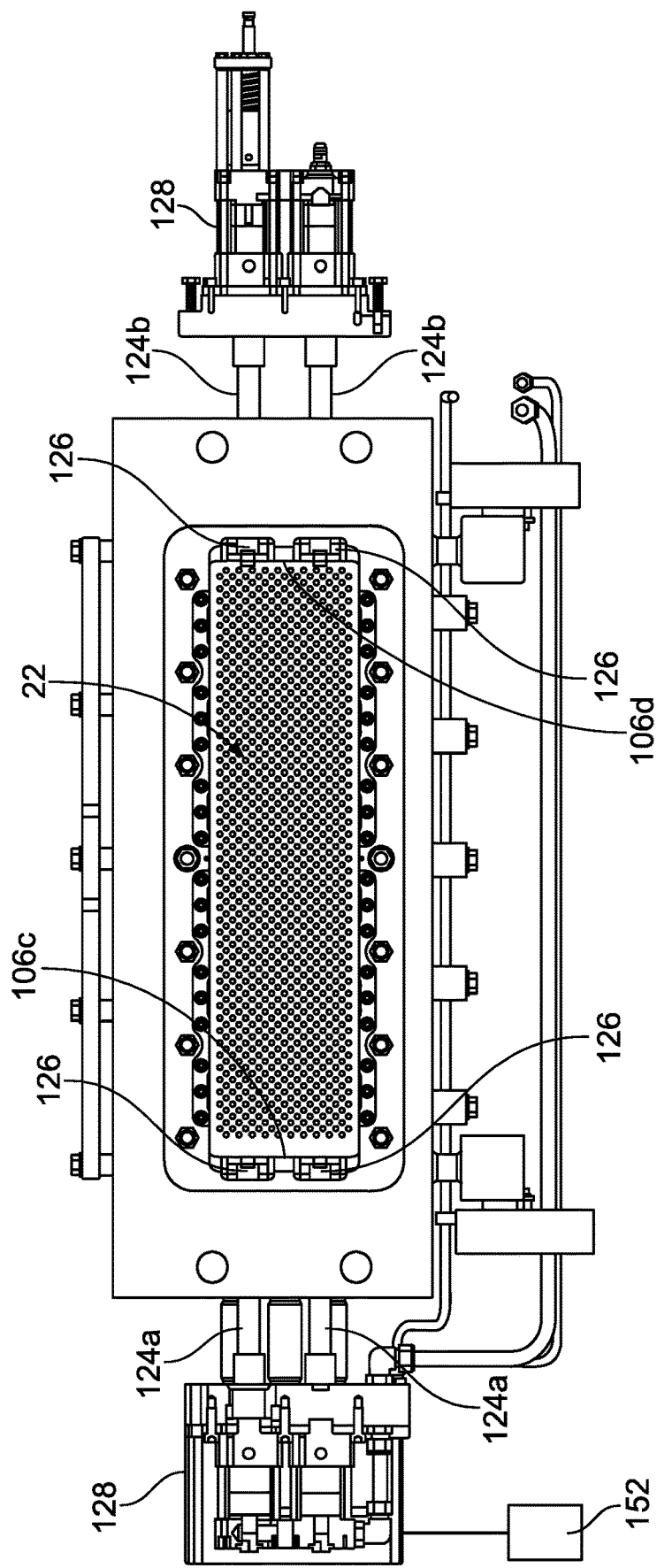
FIG. 12 depicts a plan view of a drive mechanism, a coupler, the stripper plate and the wear plate in accordance with an embodiment.

As disclosed in U.S. Pat. No. 8,469,697, the contents of which have been incorporated herein, in an embodiment, two sets of rods 124a, 124b, see FIG. 12, have disk shaped heads 126 that are in contact with the side edges 106c, 106d of the stripper plate 22. The rods 124a, 124b extend through the side walls of the pump box housing 36 and are connected to respective first and second drive mechanisms 128, such as hydraulic cylinders or motors. In some embodiments, the motors are servomotors or stepper motors. In some embodiments, the drive mechanisms 128 may include an on-board motor controller, which may control operation of the drive mechanisms 128, and which may form part of and/or interface with the control system 20 illustrated in and described with respect to FIG. 2. The drive mechanisms 128 may be indirectly interfaced via and controlled by control circuitry, such as may be provided by the control system 20.

To move the stripper plate 22 relative to the wear plate 82 and the fill plate 80, the first drive mechanism 128 is activated to extend the rods 124a and move the stripper plate 22 in a first direction thereby causing the rods 124b to retract within the second drive mechanism 128, and thereafter the second drive mechanism 128 is activated to extend the rods 124b and move the stripper plate 22 in a second, opposite direction thereby causing the rods 124a to retract within the first drive mechanism 128. This is repeated to cause the stripper plate 22 to slide back and forth across the wear plate 82 in a reciprocating manner. The heads 126 of the rods 124a, 124b seat within the recesses 102 of the wear plate 82 to abut against the side edges 106c, 106d of the stripper plate 22. The reciprocating motion severs any residual food product fibers which may be caught in the holes 98 of the wear plate 82 after each time the food product is passed through the holes 98 of the wear plate 82. The recesses 122 provide a running clearance to allow the stripper plate 22 to shift relative to the wear plate 82.

Figure 13:
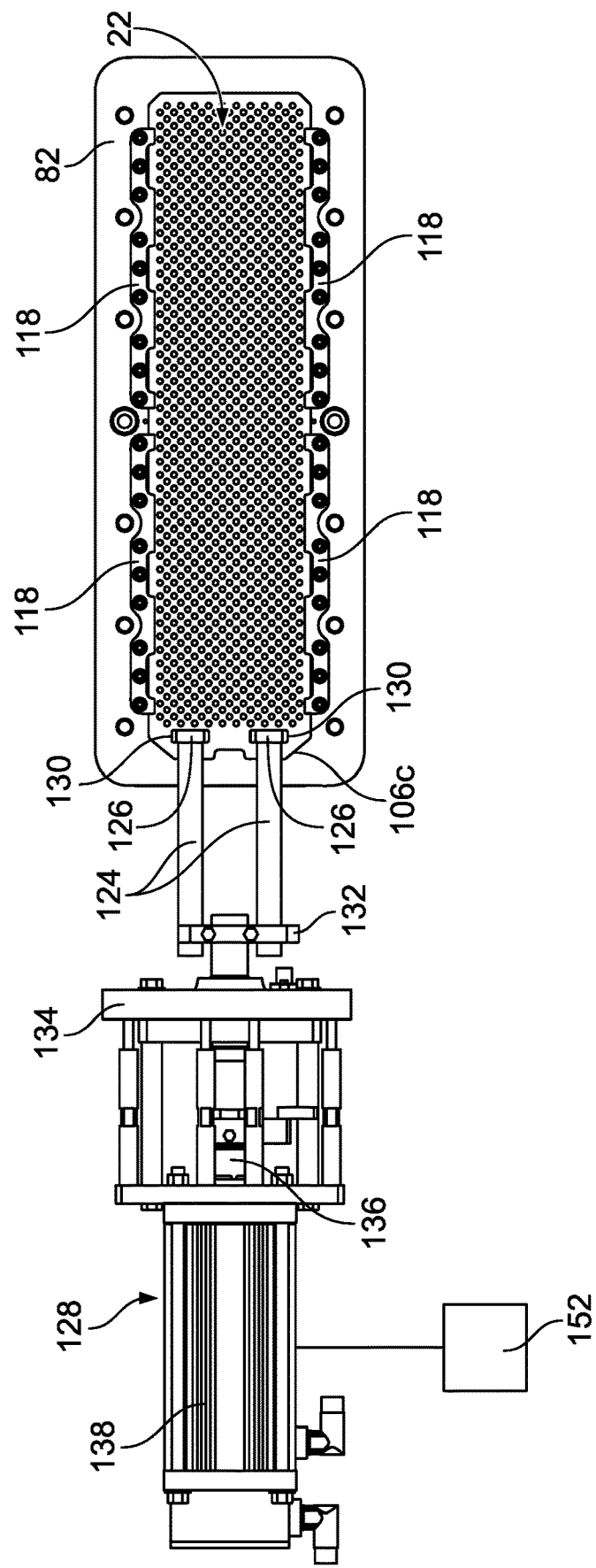
FIG. 13 depicts a plan view of a drive mechanism, a coupler, the stripper plate and the wear plate in accordance with an embodiment.

As shown in FIG. 13, the stripper plate 22 has been modified to include a pair of recesses or apertures 130 into which the heads 126 of the rods 124 are seated. A pair of spaced apart apertures 130 are provided on surface 106a and on the same side of the stripper plate 22, for example, proximate to edge 106c. Alternatively, recesses may be provided on each surface of the stripper plate 22. Rods 124 extend through the same side wall of the pump box housing 36 and are connected to a single drive mechanism 128, such as an electric actuator or a hydraulic cylinder, by a coupler 132. The drive mechanism 128 is mounted on a stationary frame 134 connected to the pump box housing 36. The drive mechanism 128 includes a piston 136 which can be extended from a cylinder 138 or can be retracted into the cylinder 138. The piston 136 is coupled to the rods 124 by the coupler 132. In this embodiment, the piston 136 of the drive mechanism 128 is linearly aligned with the rods 124. To move the stripper plate 22 relative to the wear plate 82, the drive mechanism 128 is activated to extend the piston 136 from the cylinder 138, thereby moving the rods 124 and the stripper plate 22 in a first direction relative to the wear plate 82, and thereafter the drive mechanism 128 is activated to retract the piston 136 into the cylinder 138, thereby moving the rods 124 and the stripper plate 22 in a second, opposite direction relative to the wear plate 82. This is repeated to cause the stripper plate 22 to slide back and forth across the wear plate 82 in a reciprocating manner to sever any residual food product fibers which may be caught in the holes 98 of the wear plate 82 after each time the food product is passed through the holes 98 of the wear plate 82. The recesses 102 in the wear plate 82 may be eliminated as recesses 102 are not used in this embodiment.

Figure 14:
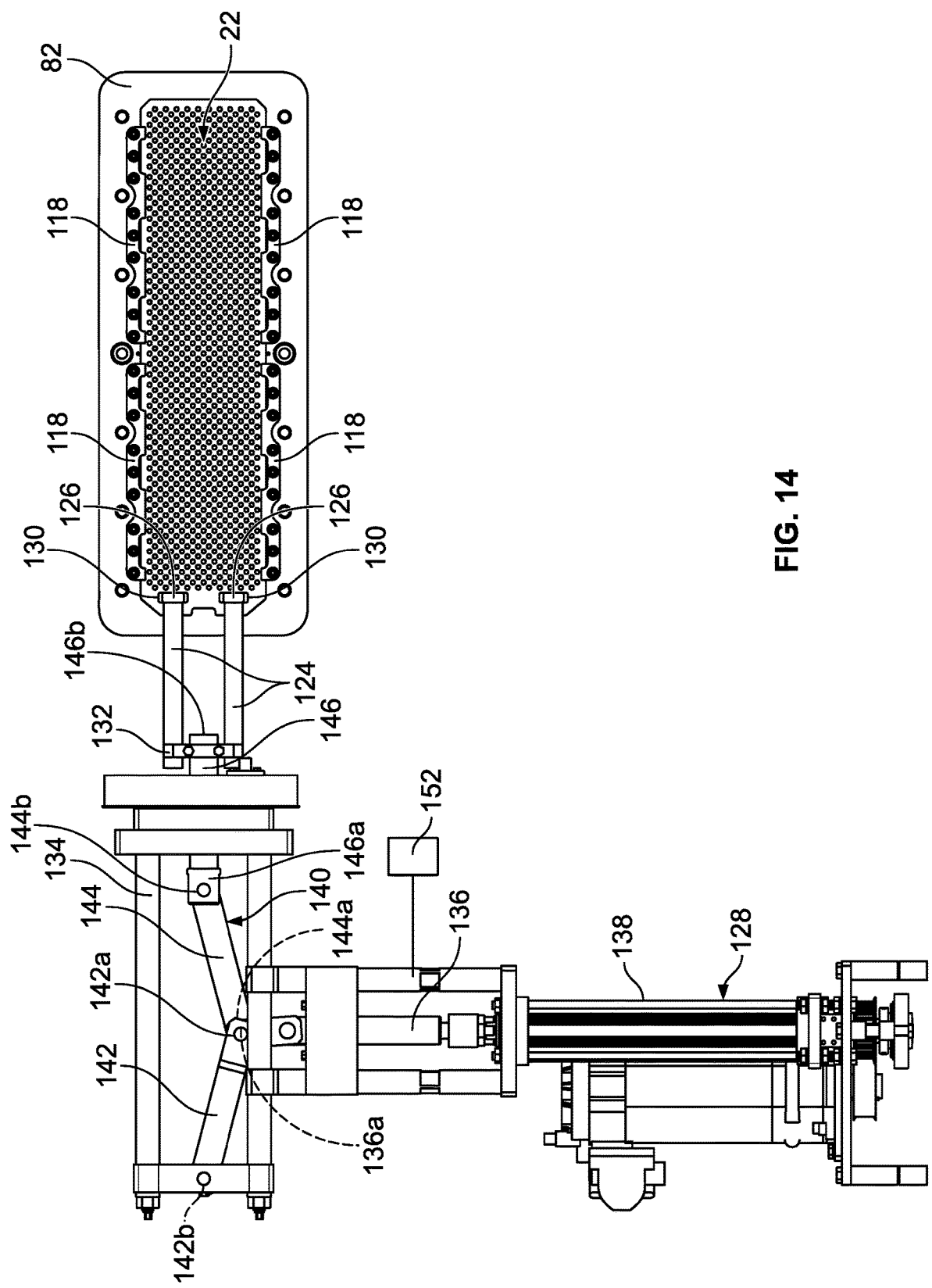
FIG. 14 depicts a plan view of a drive mechanism, a coupling arrangement, a coupler, the stripper plate and the wear plate in accordance with an embodiment.

As shown in FIG. 14, the modified stripper plate 22 and the drive mechanism 128 are used and the specifics are not repeated. The rods 124 extend through a side wall of the pump box housing 36 and are connected to the single drive mechanism 128 by a coupling arrangement 140. In this embodiment, the piston 136 of the drive mechanism 128 is not linearly aligned with the rods 124, and instead is perpendicular to the rods 124 as a result of the coupling arrangement 140. In this embodiment, the coupling arrangement 140 includes a first link 142 having a first end 142a pivotally attached to the end 136a of the piston 136 and second end 142b pivotally attached to a stationary frame 134 connected to the pump box housing 36, a second link 144 having a first end 144a pivotally attached to the end 136a of the piston 136 and second end 144b pivotally attached to a first end 146a of a rod 146, the rod 146 extending through the stationary frame 134. The rod 146 and the second end 142b of the first link 142 may be linearly aligned. A second end 146b of the rod 146 is coupled to the rods 124 by the coupler 132. To move the stripper plate 22 relative to the wear plate 82, the drive mechanism 128 is activated to move the rods 124 and the stripper plate 22 in a first direction relative to the wear plate 82, and thereafter the drive mechanism 128 is activated to move the rods 124 and the stripper plate 22 in a second, opposite direction relative to the wear plate 82. When the piston 136 is extended from the cylinder 138, the first ends 142a, 144a of the first and second links 142 move away from the cylinder 138 which causes the rod 146 to translate in a direction perpendicular to the piston 136 and toward the wear plate 82. This movement of the rod 146 causes movement of the rods 124 and then movement of the stripper plate 22 in the first direction. When the piston 136 is retracted into the cylinder 138, the first ends 142a, 144a of the first and second links 142 move toward the cylinder 138 which causes the rod 146 to translate in a direction perpendicular to the piston 136 and away from the wear plate 82. This movement of the rod 146 causes movement of the rods 124 and then movement of the stripper plate 22 in the second, opposite direction. This is repeated to cause the stripper plate 22 to slide back and forth across the wear plate 82 in a reciprocating manner to sever any residual food product fibers which may be caught in the holes 98 of the wear plate 82 after each time the food product is passed through the holes 98 of the wear plate 82. The recesses 102 in the wear plate 82 may be eliminated as recesses 102 are not used in this embodiment.

In some embodiments, motors used for the drive mechanisms 128 are gear motors, brushless DC servo motors, Permanent Magnet DC (PMDC) motors, AC induction motors with modulated control signal and switches to control speed and direction of rotation or reciprocation, some combination thereof, or the like. In some embodiments, the motors used for the drive mechanisms 128 may include an on-board motor controller, which may control operation of the motors, and which may form part of and/or interface with the control system 20 illustrated in and described with respect to FIG. 2. The motors used for the drive mechanisms 128 may be indirectly interfaced via and controlled by control circuitry, such as may be provided by the control system 20.

The molding system 24 may include a knock-out mechanism 148 which is known in the art. Such a knock-out mechanism is disclosed in U.S. Pat. No. 8,469,697, the contents of which have been incorporated herein, and is not described in detail herein.

In operation, as the mold 28 moves, each row of mold cavities 58 move into a fill position during which the mold cavities 58 in that given row move past the holes 88 in the fill plate 80. Food product is pumped from the hopper 32 to the molding system 24 by the feeder portion 30. Food product passes through feed openings 42, 44 in the pump box 34, through the holes 112 in the stripper plate 22, through the holes 98 in the wear plate 82, and through the holes 88 in the body 84 to fill the mold cavities 58 in the mold 28. As the mold cavities 58 in the given row are filled during the movement, the mold cavities 58 are moved from the fill position to an eject position where the knock-out mechanism 148 is activated.

As the mold 28 moves into the fill position, the mold cavities 58 in the mold 28 become disposed between the fill plate body 84 and the inner platen 50, with the mold facing surface of the inner platen 50 serving as the bottom surface of the mold cavities 58 as the mold cavities 58 move through the region where it is in contact with the fill plate body 84 and the inner platen 50. In a rotary molding system, the inner platen 50 remains stationary as the mold 28 rotates past the inner platen 50. The support structure 46 behind the inner platen 50 provides support for the inner platen 50 as pressure from filling the mold cavities 58 is exerted into the mold cavities 58 during the filling process. As the mold 28 moves into the eject position, the mold cavities 58 in the mold 28 are no longer disposed between the fill plate body 84 and the inner platen 50.

During operation, the stripper plate 22 shifts relative to the wear plate 82 and the fill plate 80 from the fill position to the non-fill position, then back to the fill position and then to the non-fill position and so on, as controlled by the control system 20 as described herein. When the stripper plate 22 is in the fill position, food product can flow therethrough to fill the mold cavities 58 of the mold 28, but when the stripper plate 22 is moved to be in the non-fill position to sever the food product, food product cannot flow therethrough. When the stripper plate 22 is in the non-fill position, the mold 28 is indexed to move the next set of mold cavities 58 into the fill position.

Information relating to the position of the mold 28 and the position of the stripper plate 22 is sent to the control system 20. The control system 20 processes this information and controls movement of the stripper plate 22 in response.

A variety of means can be provided for providing positional information of the mold 28 and of the stripper plate 22. In an embodiment having the drive mechanism(s) 128 as hydraulic cylinders, a sensor 150 which senses the position of the mold 28 is provided, and a sensor 152 which senses the position of the stripper plate 22 is provided. The sensors 150, 152 send information regarding the position of the mold 28 and the stripper plate 22 to the control system 20. In an embodiment having the drive mechanism(s) 128 as hydraulic cylinders and a servo motor is provided for driving the mold 28, a sensor 152 which senses the position of the stripper plate 22 is provided, and a potentiometer, encoder, resolver or similar device of the servo motor provides positional feedback and acts as the sensor 150. In an embodiment having a servo motor provided as the drive mechanism(s) 128 and a servo motor is provided for driving the mold 28, a potentiometer, encoder, resolver or similar device of the servo motor provides positional feedback of the stripper plate 22 and acts as the sensor 152, and a potentiometer, encoder, resolver or similar device of the servo motor provides positional feedback of the mold 28 and acts as the sensor 150. In some embodiments, the sensors 150, 152 are position sensors and/or proximity sensors. Other known sensors may be used.

The control system 20 may include a non-transitory memory 154 and a processor 156 configured to process information received from the sensors 150, 152. While illustrated as a single memory 154, it will be appreciated that in some example embodiments, the memory 154 may include multiple individual memory devices collectively providing functionality of the memory 154, which may be distributed across one or more computing devices that may provide functionality of the control system 20. In some example embodiments, the memory 154 may include non-transitory memory. The processor 156 is configured to control operation (e.g., movement) of the stripper plate 22 based at least in part on data stored in memory 154. The data may include information regarding the rotational position of the mold cavities 58 of the mold 28 or the position of the mold cavities during the reciprocating movement of the mold. While illustrated as a single processor 156, it will be appreciated that in some embodiments, the processor 156 may include multiple processors collectively configured to provide functionality of the processor 156 and which may be distributed across one or more computing devices that may provide functionality of the control system 20. An example processor 156 includes, but is not limited to, a programmable logic controller (PLC) manufactured by Horner APG, LLC, model number XL7 (HE-W1E2).

The control system 20 is configured to control the drive mechanism 128 and thus the movement of the stripper plate 22. In some embodiments, the drive mechanism 128 includes interfaces, such as CAN bus interfaces configured to receive control signals from the control system 20. Other types of communication interfaces can be used to send control signals to the drive mechanism 128.

The positions of the mold cavities 58 is programmed into the memory 154. The processor 156 receives positional information from the sensor 152 on the drive mechanism 128 and the sensor 150 on the mold 28 and processes this information. The processor 156 determines when to move the stripper plate 22 and sends a signal to the drive mechanism 128 to move the stripper plate 22. In an embodiment, a signal is sent to the drive mechanism 128 a predetermined time before the mold cavities 58 are moved into the fill position to move the stripper plate 22 to the fill position, and a signal is sent to the drive mechanism 128 a predetermined time before the mold cavities 58 are completely filled to move the stripper plate 22 to the non-fill position. This is continuously repeated as the mold 28 is moved into its fill position and its eject position.

Figure 15:
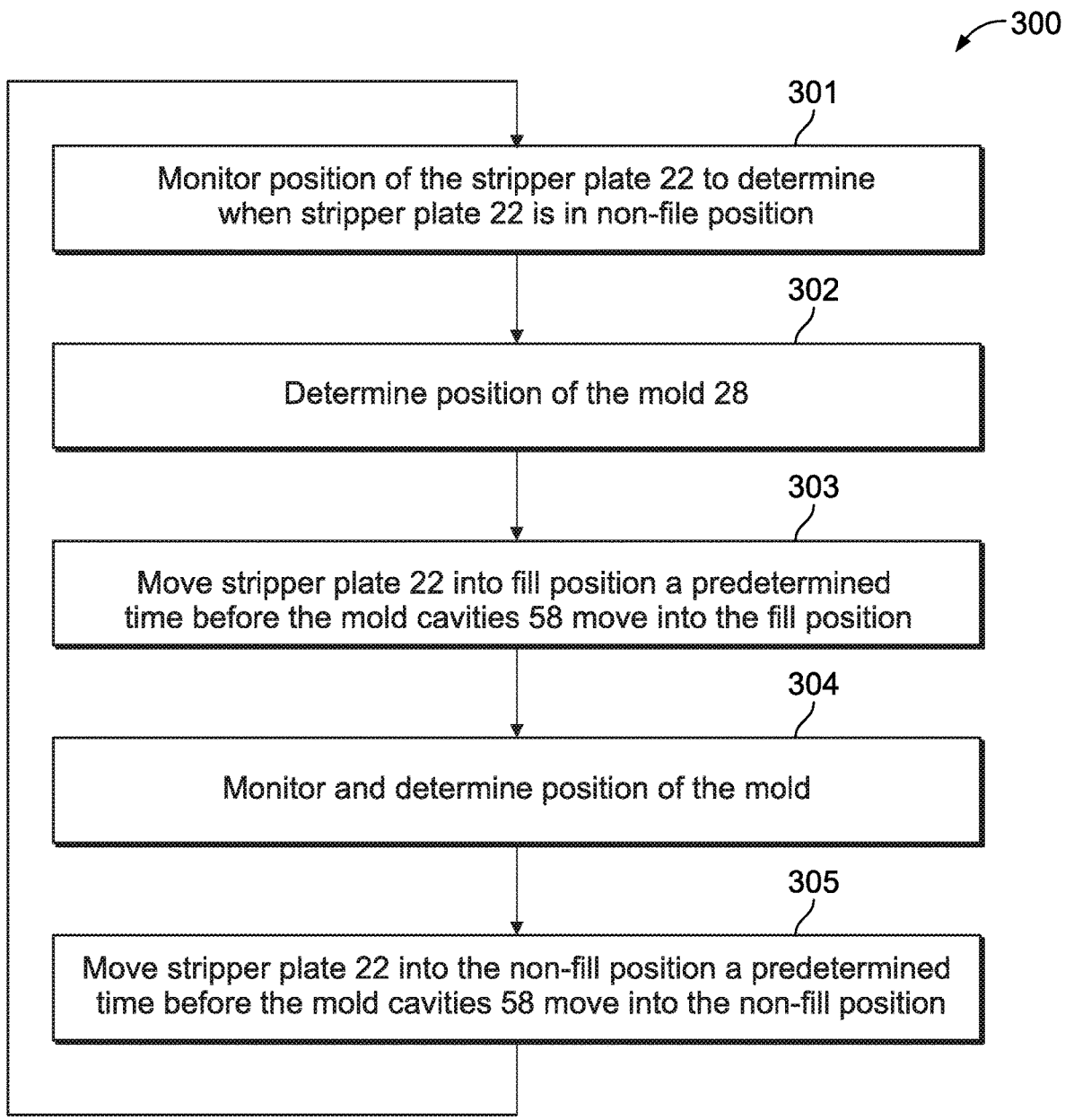
FIG. 15 is a flowchart.

A flowchart showing an embodiment of a method 300 of use is shown in the flowchart of FIG. 15. In step 301, the position of the stripper plate 22 is monitored by the processor 156 receiving positional information from the sensor 152 and the processor 156 processes this information to determine when the stripper plate 22 is in the non-fill position. In step 302, the position of the mold 28 is determined by the processor 156 receiving positional information from the sensor 150 and processes this information to determine the position of the mold 28. In step 303, the processor 156 determines when the stripper plate 22 should be moved based upon the position of the mold 28, and the stripper plate 22 is moved into the fill position a predetermined time before the mold cavities 58 move into the fill position. In step 304, the position of the mold 28 is monitored by by the processor 156 by receiving positional information from the sensor 150 on the mold 28 and processing this information to determine if the mold 28 will be moving to the non-fill position. In step 305, the stripper plate 22 is moved into the non-fill position a predetermined time before the mold cavities 58 move into the non-fill position. Thereafter, the method 300 proceds back to step 301.

It is important to know the position of the stripper plate 22 relative to the position the mold 28 to ensure consistent filling of the food product in the mold cavities 58 of the mold 28. Changes in temperature of the food product feed into the pump box 34 from one batch of food product to the next batch of food product may cause the stripper plate 22 to move slower or faster through the food product. For example, if a current batch of food product being feed through is colder than the previous batch of food product which was just feed through, the stripper plate 22 will move slower through the food product in the current batch which will delay the full shifting of the stripper plate 22 to prevent the flow of food product therethrough. Likewise, if a current batch of food product being feed through is warmer than the previous batch of food product which was just feed through, the stripper plate 22 will move faster through the food product in the current batch will cause the full shifting of the stripper plate 22 to occur sooner than the previous shift. In another example, food product may become caked onto the stripper plate 22 which causes the movement of the stripper plate 22 to slow down. In yet a further example, the drive mechanism(s) 128 driving the movement of the stripper plate 22 may become worn, which causes the movement of the stripper plate 22 to slow down. A variety of other reasons may occur which throws off the timing of the stripper plate 22 relative to the position of the mold cavities 58.

Figure 16:
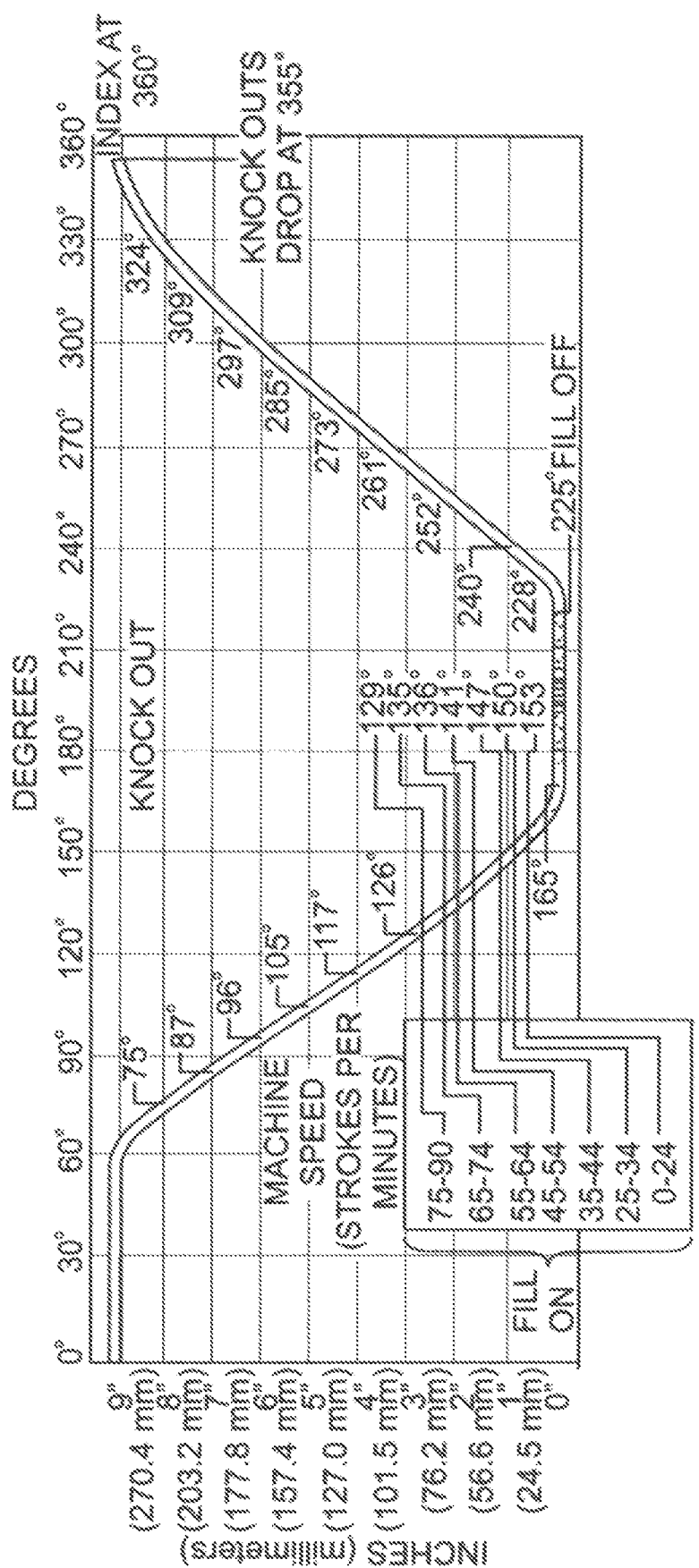
FIGS. 16 and 17 are graphs.
Figure 17:
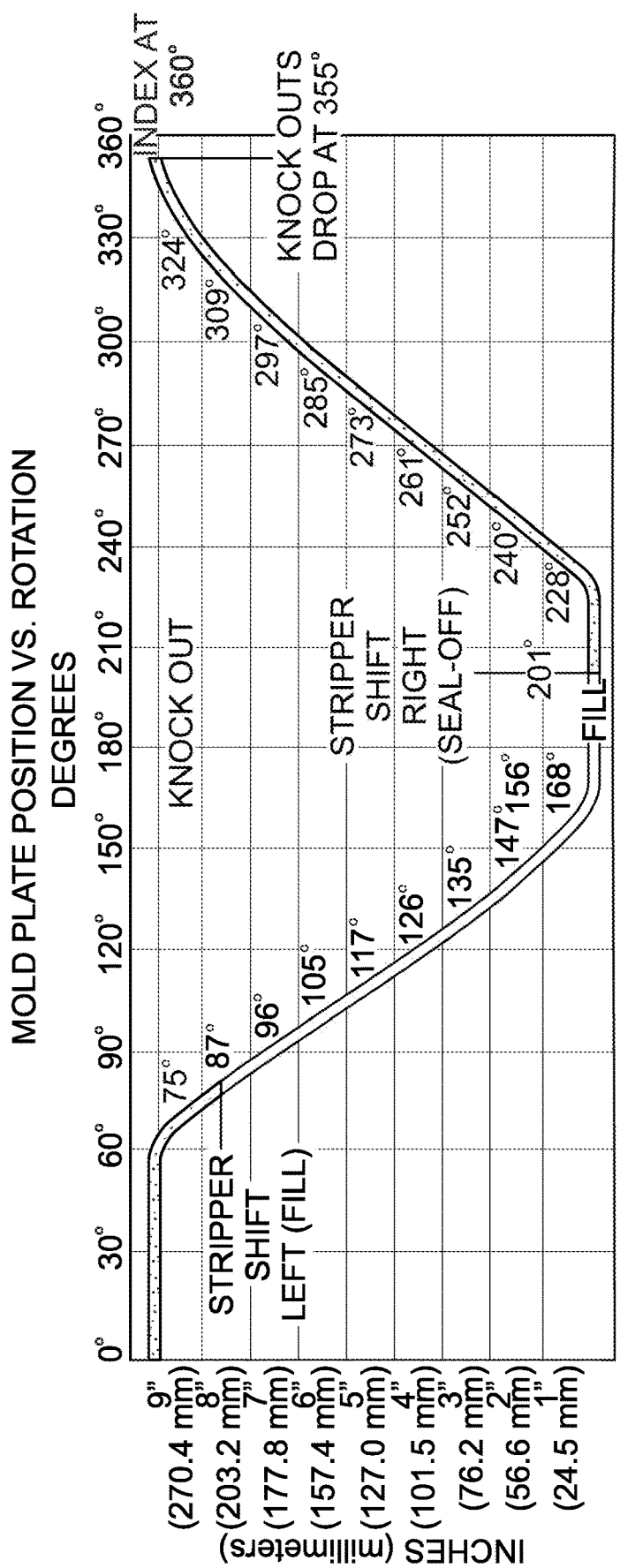

FIGS. 15 and 16 show graphs of when the stripper plate 22 is shifted relative to the rotational position of the mold 28 in an example embodiment.

The control system 20 dynamically adjusts the position of the stripper plate 22 in relation to the mold 28 to ensure consistent timing of the movement of the stripper plate 22 in relation to the position of the mold 28.

While the disclosed embodiment shows a separate wear plate 82 that can be removed, the wear plate 82 can be integrally formed with the fill plate 80.

Many modifications and other embodiments of the disclosure set forth herein will come to mind to one skilled in the art to which these disclosed embodiments pertain having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A patty forming machine configured to mold food products comprising:
   a pump box;
   a fill plate having a plurality of holes therethrough;
   a stripper plate having a plurality of holes therethrough, the stripper plate being positioned between the pump box and the fill plate, the stripper plate being movable in a reciprocating manner relative to the fill plate and the pump box from a fill position to a non-fill position;
   a stripper plate sensor operatively coupled to the stripper plate, the stripper plate sensor configured to determine positions of the stripper plate;
   a mold comprising a wall having a plurality of mold cavities;
   a motor coupled to the mold and configured to continuously move the mold relative to the fill plate;
   a mold sensor operatively coupled to the mold, the mold sensor configured to determine positions of the mold; and
   a processor operatively coupled with the stripper plate sensor and with the mold sensor, the processor being configured to receive information from the stripper plate sensor and the mold sensor and to determine when the stripper plate is to be moved from the non-fill position to the fill position relative to a determined position of the mold.

2. The patty forming machine of claim 1, wherein one of the sensors is a position sensor.

3. The patty forming machine of claim 1, wherein the sensors are position sensors.

4. The patty forming machine of claim 1, wherein one of the sensors is a proximity sensor.

5. The patty forming machine of claim 1, wherein the sensors are proximity sensors.

6. The patty forming machine of claim 1, further comprising a hydraulic cylinder which moves the stripper plate in the reciprocating manner.

7. The patty forming machine of claim 1, wherein the motor is a servo motor, and the mold sensor is one of a potentiometer, an encoder and a resolver of the servo motor.

8. The patty forming machine of claim 7, further comprising a hydraulic cylinder which moves the stripper plate in the reciprocating manner.

9. The patty forming machine of claim 1, wherein the motor is a servo motor, and the mold sensor is one of a potentiometer, an encoder and a resolver of the servo motor, and wherein the stripper plate is moved in the reciprocating manner by a servo motor and the stripper plate sensor is one of a potentiometer, an encoder and a resolver of the servo motor.

10. The patty forming machine of claim 1, wherein the mold is a cylindrical drum having mold cavities.

11. The patty forming machine of claim 1, further comprising a wear plate separate from the fill plate, the wear plate being positioned between the stripper plate and the fill plate.

12. The patty forming machine of claim 11, wherein the stripper plate is attached to the wear plate by a plurality of retainer bars.

* * * * *